United States Patent
Yamamoto et al.

(10) Patent No.: US 8,579,571 B2
(45) Date of Patent: Nov. 12, 2013

(54) CONNECTING FASTENER

(75) Inventors: Hiroki Yamamoto, Tokyo (JP);
Takamichi Hoshino, Tokyo (JP); Takao Tsukada, Tokyo (JP)

(73) Assignee: Max Co., Ltd., Tokyo (JP)

( * ) Notice: Subject to any disclaimer, the term of this patent is extended or adjusted under 35 U.S.C. 154(b) by 142 days.

(21) Appl. No.: 12/918,648

(22) PCT Filed: Mar. 31, 2009

(86) PCT No.: PCT/JP2009/056716
§ 371 (c)(1),
(2), (4) Date: Aug. 20, 2010

(87) PCT Pub. No.: WO2009/123214
PCT Pub. Date: Oct. 8, 2009

(65) Prior Publication Data
US 2010/0329818 A1    Dec. 30, 2010

(30) Foreign Application Priority Data
Mar. 31, 2008  (JP) ................................. 2008-093066

(51) Int. Cl.
*F16B 15/08*   (2006.01)

(52) U.S. Cl.
USPC .......................................... 411/442; 206/345

(58) Field of Classification Search
USPC .................... 411/440–444; 206/345
See application file for complete search history.

(56) References Cited

U.S. PATENT DOCUMENTS

| | | | | |
|---|---|---|---|---|
| 3,212,632 A * | 10/1965 | Baum et al. | | 206/346 |
| 3,463,304 A * | 8/1969 | Gallee et al. | | 206/345 |
| 3,756,391 A * | 9/1973 | Keck et al. | | 206/343 |
| 3,944,068 A * | 3/1976 | Maier et al. | | 206/347 |
| 4,684,022 A * | 8/1987 | Potucek | | 206/347 |
| 4,913,611 A | 4/1990 | Leistner | | |
| 4,932,821 A * | 6/1990 | Steffen et al. | | 411/442 |
| 5,090,607 A * | 2/1992 | Ohuchi et al. | | 227/136 |
| 6,029,814 A * | 2/2000 | Ohuchi | | 206/347 |
| 6,779,959 B1 * | 8/2004 | Yang | | 411/443 |
| 7,021,462 B2 * | 4/2006 | Powers et al. | | 206/338 |
| 7,108,130 B2 * | 9/2006 | Herelier et al. | | 206/338 |

FOREIGN PATENT DOCUMENTS

| | | |
|---|---|---|
| CN | 1250137 A | 4/2000 |
| JP | 50-020077 | 3/1975 |
| JP | 52-086077 | 12/1975 |
| JP | 52-032072 | 8/1977 |
| JP | S55-071807 | 5/1980 |
| JP | 57-6109 | 1/1982 |
| JP | 59-157108 | 10/1984 |
| JP | 5-83425 | 11/1993 |

(Continued)

*Primary Examiner* — Victor Batson
*Assistant Examiner* — Caroline L Natirboff
(74) *Attorney, Agent, or Firm* — Drinker Biddle & Reath LLP

(57) ABSTRACT

In a connecting fastener consisting of a plurality of fasteners connected through a connecting member of synthetic resin, the connecting member includes a ring-shaped portion attached to so as to encircle the shaft of each of the fasteners to be connected and a connecting portion connected to the ring-shaped portions encircling adjacent fasteners. When the fasteners each suffers from the blow at the time of driving by a fastener driving tool, the ring-shaped portions each has strength enough to be held over the shaft and the connecting portion has strength enough to be broken.

3 Claims, 6 Drawing Sheets

(56) References Cited

FOREIGN PATENT DOCUMENTS

| | | |
|---|---|---|
| JP | 6-35623 | 5/1994 |
| JP | 2000-240622 | 9/2000 |
| JP | 2003-301824 | 10/2003 |
| JP | 2005-90723 | 4/2005 |
| JP | 2006-070939 | 3/2006 |
| WO | 2005-028160 | 3/2005 |
| WO | 2008/001725 | 1/2008 |

* cited by examiner

CONNECTING FASTENER

FIELD OF THE INVENTION

The present disclosure relates to a connecting fastener which is used for a tool for driving a fastener for which a driving source such as an air pressure or fuel gas is employed.

DESCRIPTION OF RELATED ART

Generally, as a connecting system for a connecting fastener consisting of a plurality of fasters, there is a wire connecting system of connecting welded shafts of the respective using parallel two wires. Further, there are also a linear connecting system of integrally bonding/connecting the plurality of fasteners onto a linear connecting belt of synthetic resin, and a connecting sheet system in which the fasteners are inserted held in upper and lower holding pieces projected from the upper and lower ends of a planar-sheet like connecting belt of synthetic resin at regular intervals in the same directions. As an example of the linear connecting system, there is the system as disclosed in Patent Reference 1, and as an example of the connecting sheet system, there is the system as disclosed in Patent Reference 2.

Patent Reference 1: JP-A-2003-301824
Patent Reference 2: JP-A-2000-240622

However, the above related-art systems are problematic in the following points. In the connecting faster of the wire connecting system, wires will be scattered in driving. In the linear connecting system using a synthetic resin connecting member, the connecting faster cannot be wound in a coil shape, and cannot be manufactured at low cost from the standpoint of forming.

In the connecting sheet system, in driving, the connected fasteners are separated from the connecting sheet and the connecting sheet is discharged from the discharging slot of a fastener driving tool. The connecting sheet corresponding the length of the number of connected fasters is discharged and dangles from the driving tool. This hindered the work and reduced the working efficiency.

After completion of driving a series of connecting nails, the connecting sheet must be scrapped as rubbish. This work was troublesome.

SUMMARY OF INVENTION

The invention provides a connecting fastener capable of facilitating a driving operation, eliminating the need of scrapping a connecting member and being manufactured at low cost.

According to a first aspect of the invention, a connecting fastener is provided with plurality of fasteners and a connecting member of synthetic resin connecting the plurality of fasteners. The connecting member includes a ring-shaped portion attached to so as to encircle a shaft of each fastener and a connecting portion connected to the ring-shaped portion encircling adjacent fasteners. When driving the fastener by a fastener driving tool, the ring-shaped portion has strength enough to be held over the shaft, and the connecting portion has strength enough to be broken.

According to a second aspect of the invention, an outer shape of the ring-shaped portion may be formed in a size approximately equal to a head of each fastener.

According to a third aspect of the invention, the ring-shaped portion and the connecting portion may be formed in a sheet-shape.

According to a fourth aspect of the invention, the ring-shaped portion may be formed wall-thick enough for the shaft of the fastener to be guidable in a driving direction in an ejecting mouth of the fastener driving tool, and the connecting portion may be formed wall-thin.

According to a fifth aspect of the invention, the connecting portion may be formed at a position offset from a line connecting centers of adjacent ring-shaped portions.

According to a sixth aspect of the invention, the connecting portion may be formed on the line connecting the centers of adjacent ring-shaped portions.

Other aspects and advantages of the invention will be apparent from the following description, the drawings and the claims.

DETAILED DESCRIPTION OF EXEMPLARY EMBODIMENTS

Hereinafter, an explanation will be given of a connecting nail according to exemplary embodiments of the invention.

Figure 1:
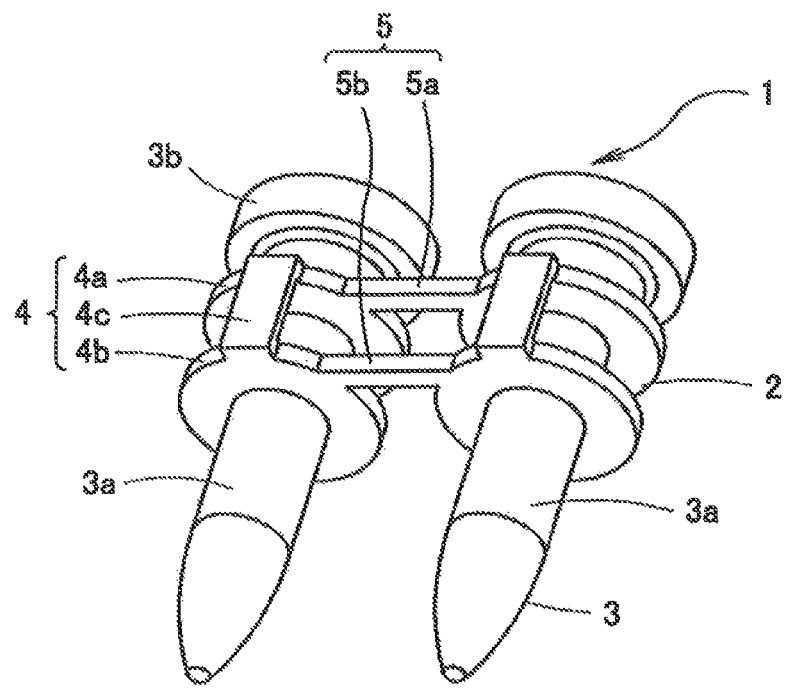
FIG. 1 is a perspective view of a connecting nail according to the invention.

Referring to FIG. 1, a connecting nail 1 consists of a plurality of nails 3 connected through a connecting member 2 of synthetic resin such as polypropylene. The connecting member 2 has ring-shaped portions 4 and a connecting portion 5. The ring-shaped portions 4 each is attached so as to encircle the shaft 3a of each of the nails 3 connected. The connecting portion 5 connects the ring-shaped portions 4 adjacent to each other. It should be noted that the connecting member 2 connects the plurality of nails 3, but FIG. 1 illustrates only the manner of connecting two nails 3.

The ring-shaped portions 4 each consists of an upper ring-shaped segment 4a and a lower ring-shaped segment 4b which are connected through a connecting piece 4c. The outer shape of the ring-shaped portion 4 is circular and has a size approximately equal to that of the head 3b of the nail 3. The connecting piece is connected to the ring-shaped portion at a location spaced from the connecting portion.

The connecting portion 5 consists of an upper connecting segment 5a and a lower connecting segment 5b which connect the upper ring-shaped segments 4a and the lower ring-shaped segments 4b, respectively. The upper ring-shaped segment 4a and the lower ring-shaped segment 4b are fit over the shaft 3a.

The connecting portion 5 has strength enough to be broken when driving the fastener by a fastener driving tool. The ring-shaped portion 4 has strength enough to be held over the shaft 3a. However, it should be noted that the ring-shaped portion 4 may have the strength of the above magnitude in a state where the upper ring-shaped segment 4a and the lower ring-shaped segment 4b are integrally connected through the connecting piece 4c.

The upper connecting segment 5a and the lower connecting segment 5b are formed at an offset position deviated towards the one side from the line connecting the centers of the adjacent ring-shaped portions 4, respectively.

Figure 2:
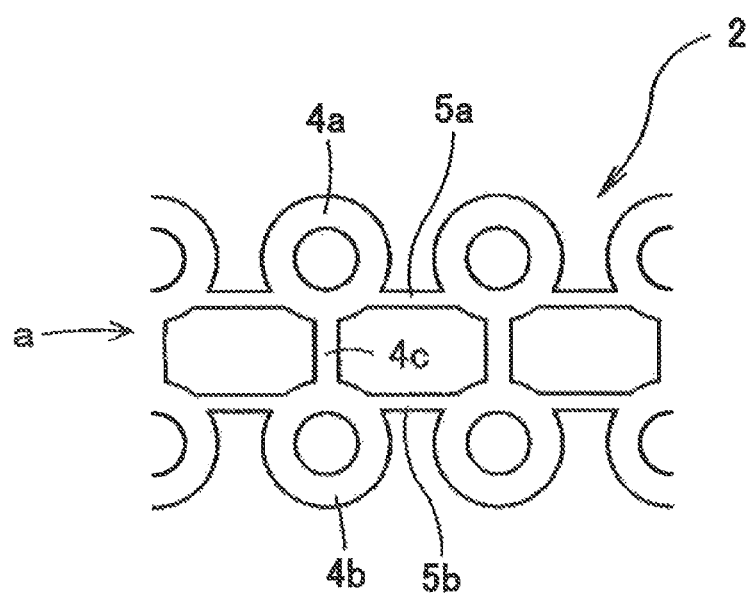
FIG. 2 is a developed view of a connecting member.

The connecting member 2 can be assembled by pressing a synthetic resin sheet "a" shown in FIG. 2 and bending the sheet "a".

Figure 3:
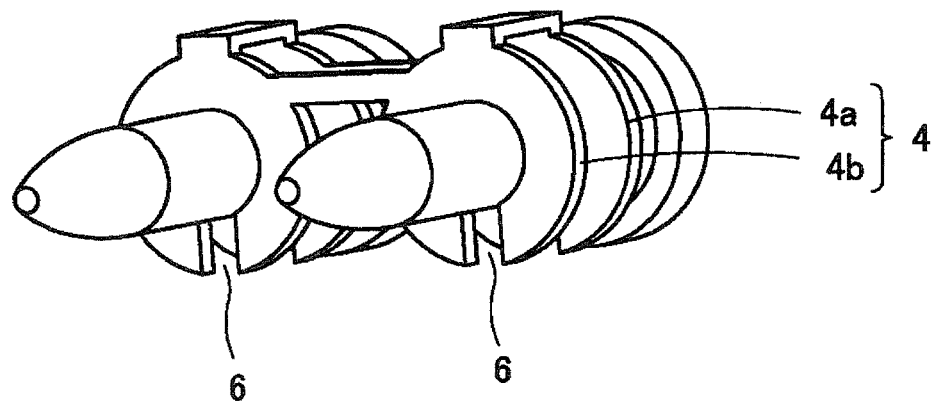
FIG. 3 is a perspective view of a ring-shaped portion notched in part.
Figure 4:
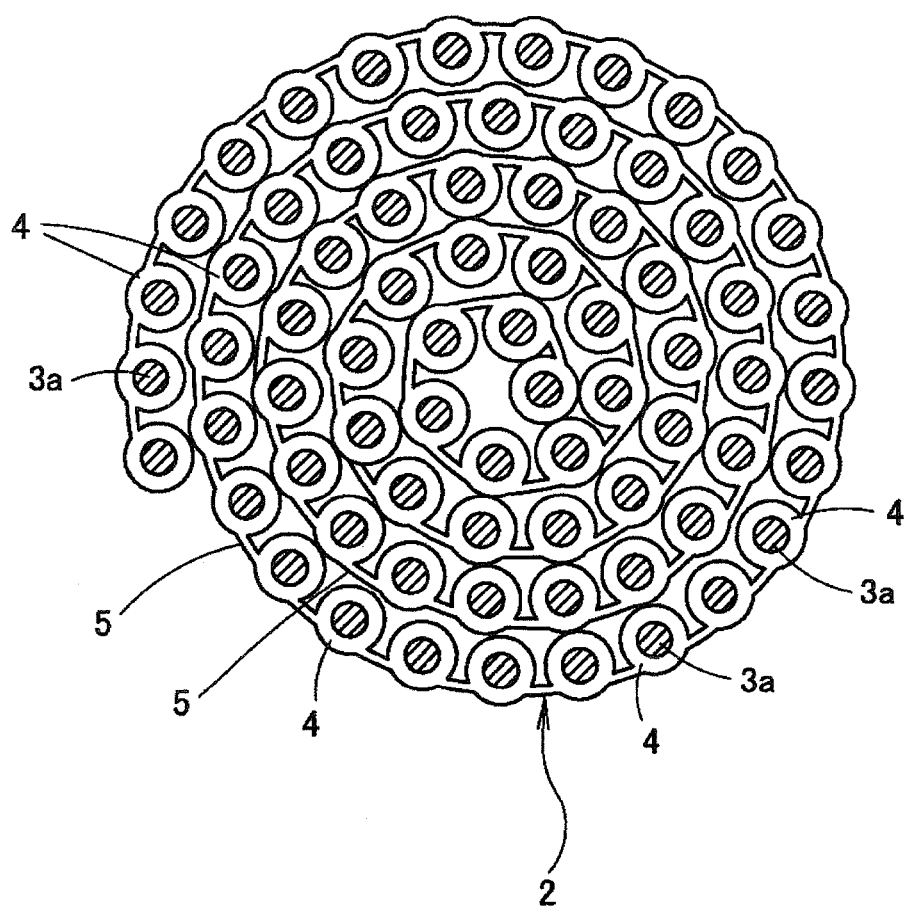
FIG. 4 is a plan view simply showing the state where a connecting nail is wound in a coil shape.

The ring-shaped portion 4 may not encircle the entire periphery of the shaft 3a of the nail 3. For example, as shown in FIG. 3, it may be notched in a part 6.

The connecting nail 1 structured as described above is wrapped in a state wound in a coil shape like a connecting nail of the ordinary wire connecting system. In winding, as shown in FIG. 2, the upper connecting segment 5a and lower connecting segment 5b are formed at a position offset from the line connecting the centers of the adjacent upper ring-shaped segments 4a and lower ring-shaped segments 4b, respectively. Therefore, by winding the connecting nail 1 with the offset side oriented toward the outside of the coil, the winding diameter at the center can be reduced. Thus, the entire shape of the connecting nail 1 can be made compact. Accordingly, the magazine of a nail driver using the connecting nail 1 can be downsized.

Figure 5:
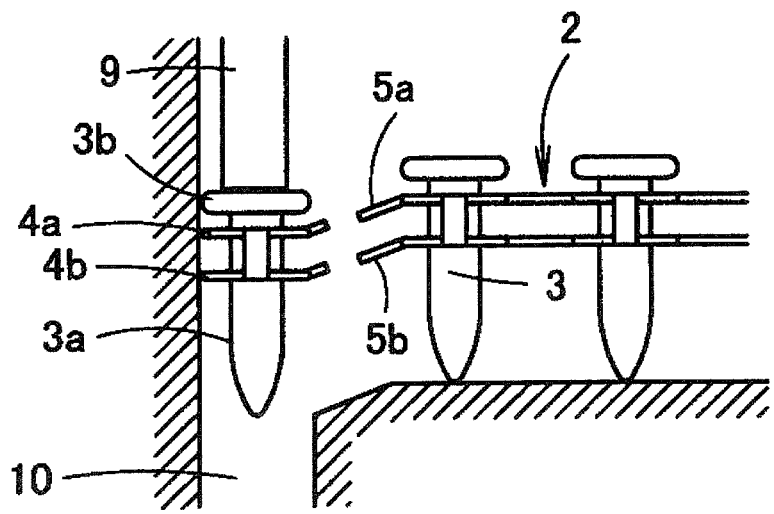
FIG. 5 is a sectional view of an ejecting mouth in the blowing state of a connecting nail.

The connecting nail 1 wound in a coil shape is loaded in a cylindrical magazine (not shown). The connecting nail 1 loaded in the magazine is fed in the driving mouth of the driver successively from the nail 3 at the top. Subsequently, as shown in FIG. 5, the nail 3 is driven by a driver 9 knocked by a knocking mechanism. In driving the nail, the ring-shaped segments 4a, 4b of the connecting member 2 have the strength enough to be not deviated from the shaft 3a but held over the shaft 3a; and the connecting segments 5a, 5b have the strength enough to be broken. Therefore, with the ring-shaped portion 4 being held over the shaft 3a, the connecting portion 5 will be broken and separated from the connecting member 2 of a subsequent nail 3. Thus, the ring-shaped portion 4 is fixed in a state where it is sandwiched between the member to be nail-driven and the head of the nail 3. The subsequent nail 3 will be driven in the same manner. Accordingly, with a progress of the nail-driving work, the connecting member 2 will not dangle from the nail driver. As a result, the working efficiency can be remarkably improved as compared with the related-art work of driving out the connecting nail 1 using the connecting sheet.

The ring-shaped portion 4 of the connecting nail 2 is formed in a circular shape in the size approximately equal to that of the head 3b of the nail 3. Therefore, when the nail 3 fed in the ejecting mouth 10 suffers from the blow by the driver 9, it can be guided in a driving direction without the shaft 3a and foot of the nail 3 wobbling within the ejecting mouth so that the nail 3 can be appropriately driven. It should be noted that the shape of the ring-shaped portion 4 is not limited to the circle, but may be, formed for example a toothed-wheel shape.

In accordance with the above configuration, at the time of completing the sequential driving out of the connecting nail 1, the connecting member 2 is driven together with the nail 3, and fixed on the rear side of the head 3b of the nail 3. For this reason, it is not necessary to scrap the connecting member 2. Thus, the workability can be improved.

The connecting member 2 can be easily manufactured by press-working a synthetic resin sheet. Only a single sheet permits the nails to be connected. Thus, the production cost can be reduced.

The embodiment of the connecting nail 1 should not be limited in that described above. The connecting nail can be manufactured in the following various manners.

Figure 6:
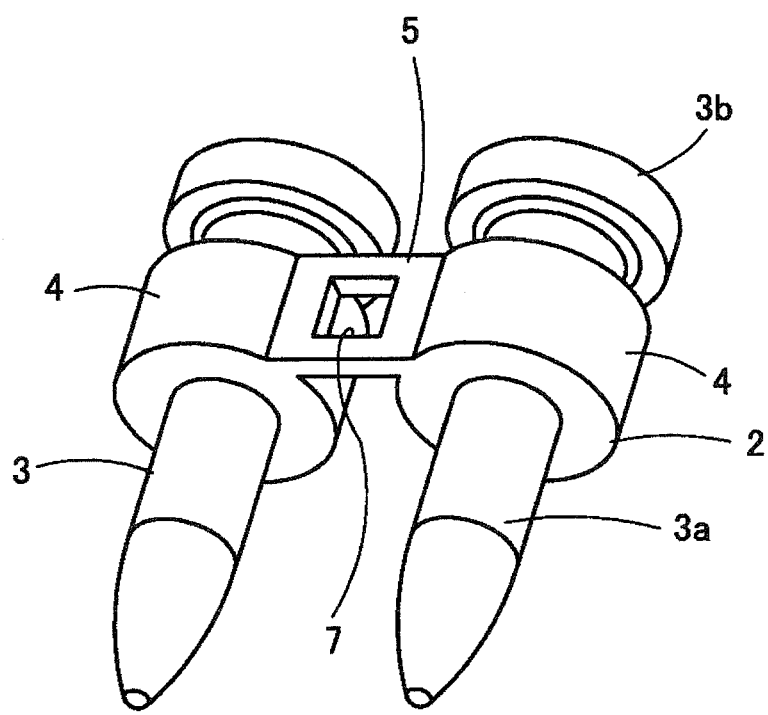
FIG. 6 is a perspective view of another manner of a connecting nail.

In the connecting nail 1 illustrated in FIG. 6, the ring-shaped portion 4 of the synthetic resin connecting member 2 is formed wall-thick and in a size approximately equal to that of the head 3b of the nail 3. The connecting portion 5 is formed wall-thin.

The connecting portion 5 is wall-thin and has a width corresponding to that of the ring-shaped portion 4, but has an opening 7 formed at the center so as to give the strength enough to be broken in driving. The connecting portion 5 is formed at the position offset from the line connecting the centers of the adjacent ring-shaped portions 4.

Figure 7:
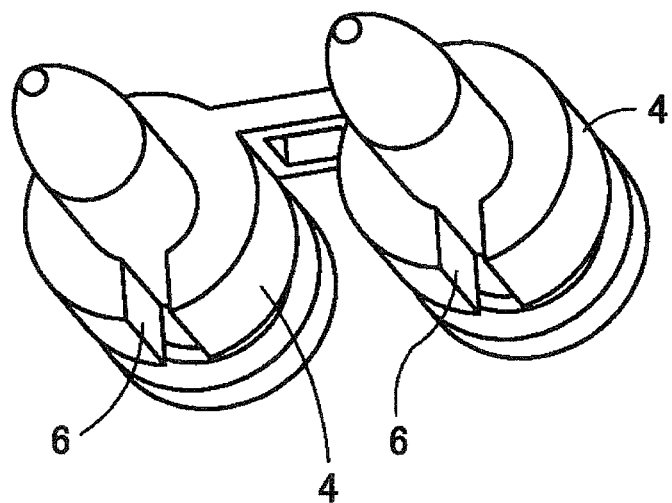
FIG. 7 is a perspective view showing the state where a ring-shaped portion is notched in part.

In this case also, the ring-shaped portion 4 is not required to encircle the entire periphery of the shaft 3a of the nail 3. As shown in FIG. 7, it may be notched in a part 6.

In accordance with the connecting nail 1 having the configuration described above, the ring-shaped portion 4 of the connecting member 2 has the strength enough to be not deviated from the shaft 3a but held over the shaft 3a in driving out; and the connecting portion 5 has the strength enough to be broken in driving out. Therefore, with the ring-shaped portion 4 being held over the shaft 3a, the connecting portion 5 will be broken and separated from the connecting member 2 of a subsequent nail 3. Accordingly, with a progress of the nail-driving work, the connecting member 2 will not dangle from the nail driver, thereby remarkably improving the working efficiency. Further, at the time of completing the sequential driving out of the connecting nail 1, the connecting member 2 is driven together with the nail 3, and fixed on the rear side of the head 3b of the nail 3. For this reason, it is not necessary to scrap the connecting member 2. Thus, the workability is remarkably improved.

In addition, the ring-shape portion 4 is wall-thick and difficult to be deformed. Thus, when the nail 3 is driven, the shaft 3a of the nail 3 can be more surely guided in the driving direction. Further, the connecting portion 5 is formed at the position offset from the line connecting the centers of the adjacent ring-shaped portions 4. For this reason, the entire shape of the connecting nail 1 can be made compact.

The connecting member 2 can be easily manufactured by press-working a wall-thick synthetic resin sheet and making the opening 7. Further, only a single sheet permits the nails to be connected. Thus, the production cost can be reduced.

The ring-shaped portion 4 of the connecting member 2 is formed in a circular shape in the size approximately equal to that of the head 3b of the nail 3. Therefore, in nail-driving, the shaft 3a and foot of the nail 3 can be guided in the driving direction.

Figure 8:
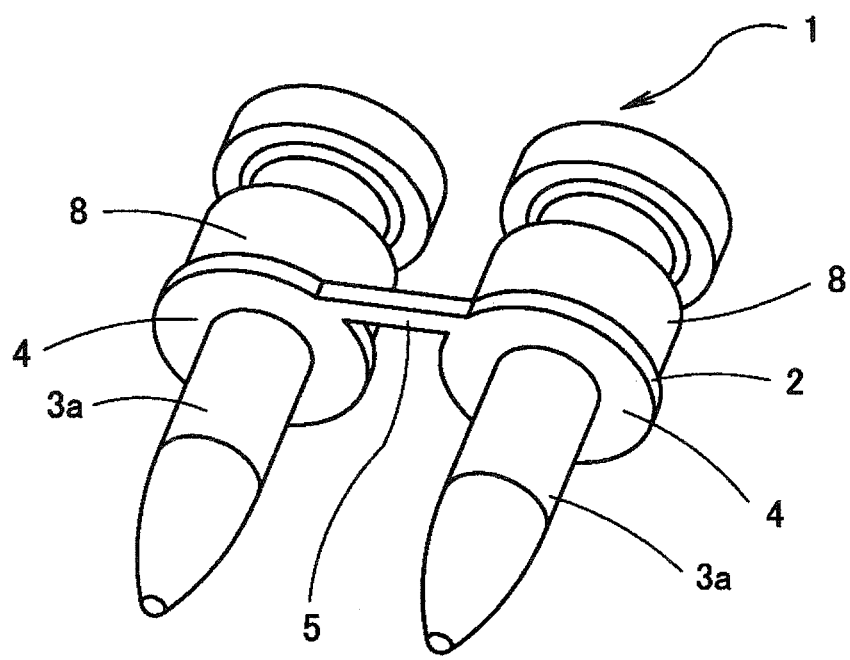
FIG. 8 is further another manner of a connecting nail.

Next, in a connecting nail 1 as shown in FIG. 8, a single nail shaft 3a is provided with a guide cylinder 8 without the connecting portion 5, and a synthetic resin connecting member 2 having a ring-shaped portion 4 with the connecting portion 5. The guide cylinder 8 serves to guide the shaft 3a and foot of the nail 3 when the nail 3 is driven. The guide cylinder 8 and the connecting member 2 are arranged in a superposed manner.

In the connecting member 2, a plurality of ring-shaped portions 4 are connected with each other through the connecting portion 5. Both the ring-shaped portion 4 and the connecting portion 5 are formed wall-thin and the connecting portion 5 is formed at the position offset from the line connecting the centers of the adjacent ring-shaped portions 4.

Figure 9:
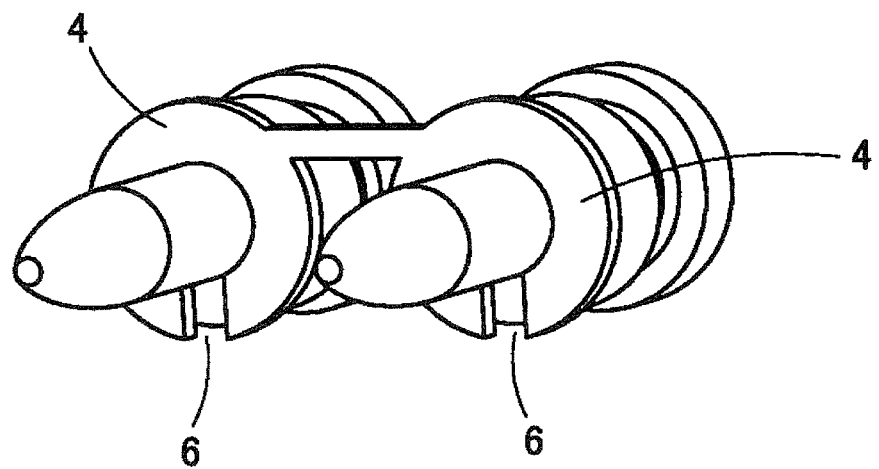
FIG. 9 is a perspective view showing the state where a ring-shaped portion is notched in part.

In this case also, the guide cylinder 8 and the ring-shaped portion 4 are formed in the size approximately equal to that of the head 3b of the nail 3. The ring-shaped portion 4 is not required to encircle the entire periphery of the shaft 3a of the nail 3. As shown in FIG. 9, it may be notched in a part 6. It may be formed in a toothed-wheel shape. Further, when driving the nail 3 by the nail driver, the ring-shaped portion 4 has strength enough to be held over the shaft 3a and the connecting portion 5 has strength enough to be broken.

In the connecting nail 1 having the structure described above, the two nails 3 are connected by a single connecting portion 5. For this reason, the connecting nail 1 is apt to bend and so can be wholly wound compactly. Since the connecting portion 5 is formed at the offset position, the entire shape of the connecting nail 1 can be made further compact.

Each nail 3 is provided with the guide cylinder 8 and ring-shaped portion 4. For this reason, in nail-driving, the shaft 3a and foot of the nail 3 can be more surely guided in the driving direction.

The connecting member 2 can be manufactured at low cost by press-working a thin sheet material.

As in the embodiment described above, dangling of the connecting member 2 in nail-driving can be avoided and its scrapping after completion of the driving is not required.

Figure 10:
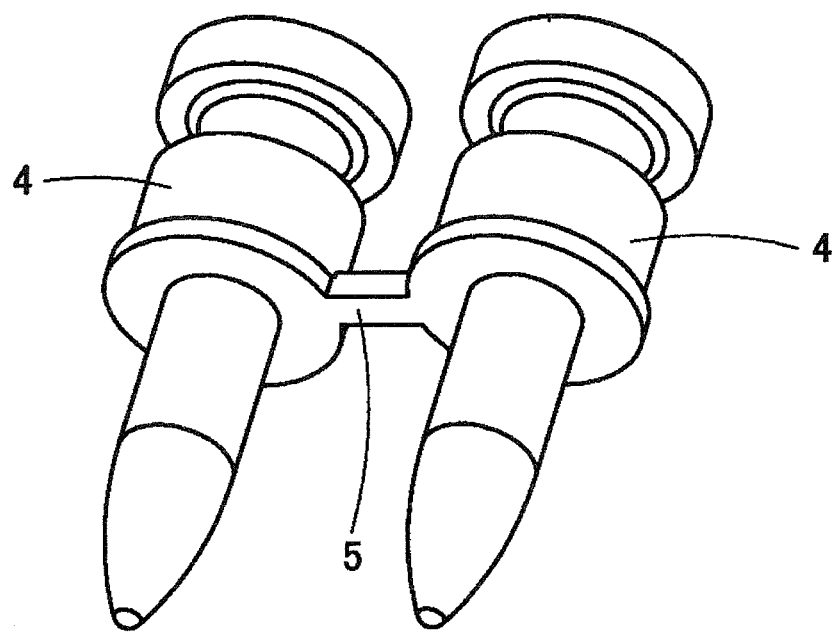
FIG. 10 is a further manner of a connecting nail.

As shown in FIG. 10, the connecting portion 5 may be arranged on the line connecting the centers of the adjacent ring-shaped portions 4.

Particularly, where the connecting nail 1 loaded in a vertical magazine is guided to the driving mouth of the nail driver, with the starting end of the connecting nail 1 pulled out from the vertical magazine, the connecting nail 1 must be twisted by 90° and thereafter guided into the driving mouth of the nail driver. In accordance with the above configuration, since there is only a single connecting portion 5 of the adjacent nails 3 in the connecting nail 1, the connecting nail 1 can be easily twisted. For this reason, limitation to the layout of the vertical magazine is trivial and the tool to be used can be made compact. On the other hand, in the structure in which the plurality of nails 3 are connected by two connecting members, since there are two connecting portions 2, the connecting nail is hard to be twisted. For this reason, limitation to the layout is significant and the tool itself will become bulky.

Where several to ten or so nails 3 remain at the time of completing the nail-driving, the remaining connecting nail 1 is once taken out from the nail driver; and immediately before nail-driving is started on the next day again, the connecting nail 1 taken out is loaded in a nose portion. Such a remaining connecting nail 1 is not still coil-like. Therefore, where the connecting nail 1 is loaded in the tool, if the connecting portion 5 is formed at the offset position, since both sides of the connecting nail 1 are not identical, attention must be paid on whether the connecting nail 1 should be loaded from which end. However, in the case of the connecting nail 1 in which the connecting portion 5 is formed on the line connecting the centers of the adjacent ring-shaped portions 4 as shown in FIG. 10, since both sides are identical, the connecting nail 1 may be loaded early from either end. Thus, the working is facilitated.

In the respective embodiments shown in FIGS. 1, 3, 6 and 7 also, the connecting portion may be arranged on the line connecting the centers of the adjacent ring-shaped portions 4.

Figure 11:
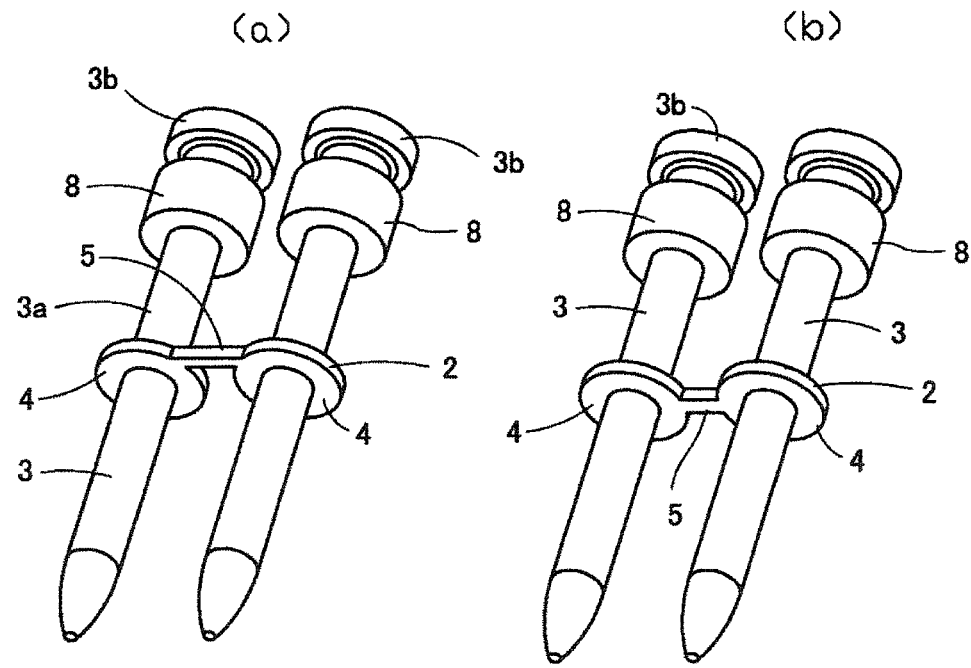
FIG. 11(a) and FIG. 11(b) are a perspective view of a connecting nail in a state connected by a wall-thin connecting member in a different manner.

The manner in which the single nail shaft 3a is provided with the guide cylinder 8 without the connecting portion 5 and the synthetic resin connecting member 2 having the ring-shaped portion 4 with the connecting portion 5 should not be limited to that described above. For example, in the case of a long shaft nail 3, as shown in FIG. 11(a), the guide cylinder 8 may be fixedly fit near the head 3b of the nail 3 and at the intermediate position of the shaft 3a, the same connecting member 2 as shown in FIG. 8 may be connected to the nail 3.

In this case also, the guide cylinder 8 and the ring-shaped portion 4 are formed in the size approximately equal to that of the head 3b of the nail 3. The ring-shaped portion 4 is not required to encircle the entire periphery of the shaft 3a of the nail 3. It may be notched in a part 6, or formed in a toothed-wheel shape. Further, when driving the nail 3 by the nail driver, the ring-shaped portion 4 has a strength enough to be held over the shaft 3a and the connecting portion 5 has a strength enough to be broken.

In the connecting nail 1 having the structure described above, the two nails 3 are connected by a single connecting portion 5. For this reason, the nail 1 is apt to bend and so can be wholly wound compactly. Since the connecting portion 5 is formed at the offset position, the entire shape of the connecting nail 1 can be made further compact.

Each nail 3 is provided with the guide cylinder 8 and ring-shaped portion 4. In addition, the nails 3 are separated from each other. For this reason, in nail-driving, the shaft 3a and foot of the nail 3 can be surely guided in the driving direction.

The guide cylinder 8 can be formed by cutting a lengthy tubular member. The connecting member 2 can be formed by press-working a thin sheet material. Thus, the connecting nail can be manufactured at low cost.

As in the embodiment described above, dangling of the connecting member 2 in nail-driving can be avoided and its scrapping after completion of the driving is not required.

Meanwhile, as shown in FIG. 11(b), the connecting portion 5 may be arranged on the line connecting the centers of the adjacent ring-shaped portions 4. In accordance with this configuration, when the connecting nail 1 remaining only in part is loaded in the magazine, since both sides thereof are identical so that the connecting nail 1 may be loaded early from either terminal. Thus, the working is facilitated.

Figure 12:
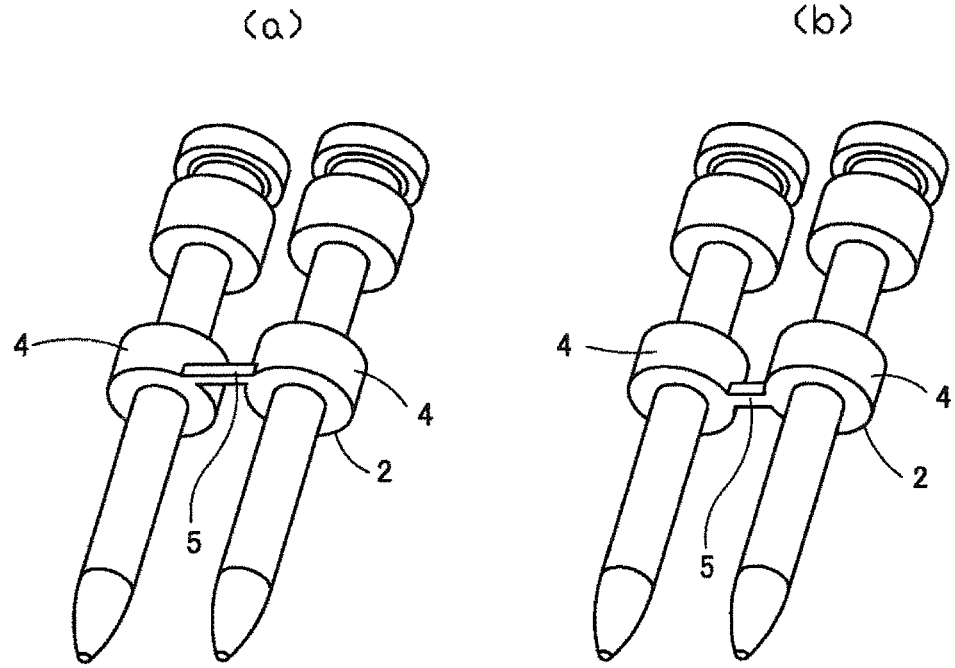
FIG. 12(a) and FIG. 12(b) are a perspective view of a connecting nail in a state connected by a wall-thin connecting member in a different manner.

The connecting member 2, as shown in FIGS. 12(a) and 12(b) may be formed wall-thick.

In the embodiments shown in FIGS. 11(a) to 12(b), the ring-shaped portion 4 may be notched in a part 6, or may be formed in a toothed-wheel shape.

In all the embodiments described above, the connecting portion may be notched to be wall-thin so that it can be easily broken.

The embodiments described above are directed to the connecting nail, but the invention can be applied to a fastener such as a connecting screw.

While the invention has been described in detail and by reference to the specific embodiments, it is apparent to those skilled in the art to which the invention pertains that various changes or modifications can be made to the invention without departing from the spirit and scope of the invention.

The present patent application is based upon Japanese Patent Application (No. 2008-093066) which was filed on Mar. 31, 2008, and the contents thereof are to be incorporated herein by reference in their entireties.

INDUSTRIAL APPLICABILITY

The present invention is used for a connecting fastener for use in a fastener driving tool.

What is claimed is:

1. A connecting fastener comprising:

a plurality of fasteners; and a connecting member of synthetic resin connecting said plurality of fasteners, wherein said connecting member includes a ring-shaped portion attached to so as to encircle a shaft of each fastener and a connecting portion connected to the ring-shaped portion encircling adjacent fasteners, wherein when driving the fastener by a fastener driving tool, said ring-shaped portion is configured to be held over the shaft, and said connecting portion is configured to be broken, wherein said ring-shaped portion includes an upper ring-shaped segment, a lower ring-shaped segment and a connecting piece which integrally connects said upper and lower ring-shaped segments, wherein said connecting piece is connected to the ring-shaped portion at a location spaced from the connecting portion, wherein said connecting piece is physically spaced apart in its entirety from another connecting piece between adjacent fasteners before driving the fastener, wherein said connecting member is configured to be assembled by pressing a synthetic resin sheet and bending said sheet, wherein said connecting portion is offset from a line connecting centers of adjacent ring-shaped portions such that the connecting portion connects the adjacent ring-shaped portions only on one side of the line connecting centers of the adjacent ring-shaped portions, wherein said connecting portion includes an elongated bar-shaped portion having planar sides extending in the direction of the line connecting centers of the adjacent ring-shaped portions so that an end of the bar-shaped portion is configured to be connected to one ring-shaped portion and the other end of the bar-shaped portion is configured to be connected to another ring-shaped portion which is adjacent to and physically spaced from the one ring-shaped portion.

2. The connecting fastener according to claim 1, wherein an outer shape of the ring-shaped portion is formed in a size approximately equal to a head of each fastener.

3. The connecting fastener according to claim 1, wherein said ring-shaped portion and said connecting portion are formed in a sheet-shape.

* * * * *